United States Patent
Horowitz

(10) Patent No.: US 11,323,734 B2
(45) Date of Patent: May 3, 2022

(54) TEMPORAL PREDICTION SHIFTING FOR SCALABLE VIDEO CODING

(71) Applicant: Google LLC, Mountain View, CA (US)

(72) Inventor: Michael Horowitz, Austin, TX (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/078,043

(22) Filed: Oct. 22, 2020

(65) Prior Publication Data

US 2021/0044823 A1 Feb. 11, 2021

Related U.S. Application Data

(63) Continuation of application No. 16/412,073, filed on May 14, 2019, now Pat. No. 10,841,604.

(60) Provisional application No. 62/726,867, filed on Sep. 4, 2018.

(51) Int. Cl.
*H04N 19/507* (2014.01)
*H04N 19/124* (2014.01)
*H04N 19/176* (2014.01)
*H04N 19/645* (2014.01)
*G06K 9/00* (2006.01)

(52) U.S. Cl.
CPC ....... *H04N 19/507* (2014.11); *G06K 9/00744* (2013.01); *H04N 19/124* (2014.11); *H04N 19/176* (2014.11); *H04N 19/645* (2014.11)

(58) Field of Classification Search
CPC .................................................. H04N 19/00
See application file for complete search history.

(56) References Cited

U.S. PATENT DOCUMENTS

| | | | |
|---|---|---|---|
| 2007/0200923 A1 | 8/2007 | Eleftheriadis et al. | |
| 2014/0218473 A1* | 8/2014 | Hannuksela | H04N 19/176 348/43 |
| 2014/0301436 A1* | 10/2014 | Wang | H04N 19/172 375/240.02 |
| 2015/0281709 A1* | 10/2015 | Bracha | H04N 19/65 375/240.26 |
| 2016/0057441 A1* | 2/2016 | Skupin | H04N 19/137 375/240.25 |

* cited by examiner

*Primary Examiner* — Peet Dhillon
(74) *Attorney, Agent, or Firm* — Honigman LLP; Brett A. Krueger

(57) ABSTRACT

A method includes receiving an input video stream and scaling the input video stream into two or more spatial layers. For each spatial layer, the method also includes generating a temporal layer prediction pattern by: obtaining a temporal base layer for a corresponding spatial layer; identifying, based on the temporal base layer, a plurality of temporal layers and a plurality of temporal time slots during a temporal period; and aligning the temporal base layer for the corresponding spatial layer with one of the temporal time slots during the temporal period. Each temporal time slot is associated with one of the temporal base layer or one of the plurality of temporal layers for the corresponding spatial layer. The temporal base layer for each corresponding spatial layer is aligned with a different temporal time slot than each other temporal base layer for each other corresponding spatial layer.

18 Claims, 7 Drawing Sheets

TEMPORAL PREDICTION SHIFTING FOR SCALABLE VIDEO CODING

CROSS REFERENCE TO RELATED APPLICATIONS

This U.S. patent application is a continuation of, and claims priority under 35 U.S.C. § 120 from, U.S. patent application Ser. No. 16/412,073, filed on May 14, 2019, which claims priority under 35 U.S.C. § 119(e) to U.S. Provisional Application 62/726,867, filed on Sep. 4, 2018. The disclosure of these prior applications are considered part of the disclosure of this application and are hereby incorporated by reference in their entireties.

TECHNICAL FIELD

This disclosure relates to temporal prediction shifting for scalable video coding.

BACKGROUND

As video becomes increasingly more common in a wide range of applications, video streams need to be transferred between users and across networks in a reliable manner. Often, different applications and/or devices may need to comply with bandwidth or resource constraints. These constraints combined with other device or network issues, make video streams vulnerable to packet loss. Depending on the packets affected by the loss, a video stream decoder may have problems recovering (i.e. decoding) packets after the packets are lost (or delayed). For example, in scalable video coding (SVC), it is common to have temporal layers associated with each spatial layer. Generally, a temporal base layer is used as a reference for encoding other frames that reside in other temporal layers. Because the temporal base layer is a reference for the other frames of the temporal layers, when packet loss affects the temporal base layer, undesirable and costly measures often must be taken to recover the packet loss. In other words, the packet loss of a temporal base layer affects the frame reference(s) for the decoder. Moreover, if a burst error occurs that causes packet loss affecting more than one temporal base layer (e.g., temporal base layers of more than one spatial layer), the resources to recover from the burst error may cause more issues for a vulnerable connection and/or compromise the connection altogether.

SUMMARY

One aspect of the disclosure provides a method for implementing a temporal prediction system. The method includes receiving, at data processing hardware of an encoder, an input video stream, and scaling, by the data processing hardware, the input video stream into two or more spatial layers. For each spatial layer, the method also includes generating, by the data processing hardware, a temporal layer prediction pattern by: obtaining a temporal base layer for a corresponding spatial layer; identifying, based on the temporal base layer, a plurality of temporal layers and a plurality of temporal time slots during a temporal period; and aligning the temporal base layer for the corresponding spatial layer with one of the temporal time slots during the temporal period. Each temporal time slot is associated with one of the temporal base layer or one of the plurality of temporal layers for the corresponding spatial layer. The temporal base layer for each corresponding spatial layer is aligned with a different temporal time slot than each other temporal base layer for each other corresponding spatial layer.

Implementations of the disclosure may include one or more of the following optional features. In some implementations, obtaining the temporal base layer for each corresponding spatial layer includes receiving a key frame for a first spatial layer and predicting the temporal base layer for a second spatial layer based on the key frame. Here, the key frame corresponds to the temporal base layer for the first spatial layer. In these implementations, predicting the temporal base layer for the second spatial layer may include upsampling the key frame for the first spatial layer, the upsampled key frame forming a reference frame for the second spatial layer with greater resolution than the first spatial layer. In other implementations, obtaining the temporal base layer for each corresponding spatial layer includes receiving a first key frame as the temporal base layer for a first spatial layer and a second key frame as the temporal base layer for a second spatial layer.

In some examples, a number of time slots for the plurality of temporal time slots of the temporal period is equal to $2^{(i-1)}$ where i corresponds to a number of the temporal layers. Alternatively, a number of temporal time slots for the plurality of temporal time slots during the temporal period is independent of a number of the temporal layers. In additional examples, at each spatial layer, the temporal period includes a plurality of hierarchical temporal layers that include at least one temporal layer predicted from a non-base temporal layer. In these additional examples, the hierarchical temporal layers of the temporal period may optionally be configured to provide a scalable frame rate for a bit stream that includes the temporal layer prediction pattern.

In some implementations, a number of spatial layers scaled from the input video stream is independent from a number of temporal time slots for the plurality of temporal time slots during the temporal period. Additionally or alternatively, aligning the temporal base layer for each corresponding spatial layer distributes a bit rate allocated across all temporal time slots during the temporal period.

Another aspect of the disclosure provides a system for implementing a temporal prediction system. The system includes data processing hardware and memory hardware in communication with the data processing hardware. The memory hardware stores instructions that when executed on the data processing hardware cause the data processing hardware to perform operations that include receiving an input video stream and scaling the input video stream into two or more spatial layers. For each spatial layer, the operations also include generating a temporal layer prediction pattern by: obtaining a temporal base layer for a corresponding spatial layer; identifying, based on the temporal base layer, a plurality of temporal layers and a plurality of temporal time slots during a temporal period; and aligning the temporal base layer for the corresponding spatial layer with one of the temporal time slots during the temporal period. Each temporal time slot is associated with one of the temporal base layer or one of the plurality of temporal layers for the corresponding spatial layer. The temporal base layer for each corresponding spatial layer is aligned with a different temporal time slot than each other temporal base layer for each other corresponding spatial layer.

Implementations of the disclosure may include one or more of the following optional features. In some implementations, obtaining the temporal base layer for each corresponding spatial layer includes receiving a key frame for a first spatial layer and predicting the temporal base layer for a second spatial layer based on the key frame. Here, the key frame corresponds to the temporal base layer for the first spatial layer. In these implementations, predicting the temporal base layer for the second spatial layer may include upsampling the key frame for the first spatial layer, the upsampled key frame forming a reference frame for the second spatial layer with greater resolution than the first spatial layer. In other implementations, obtaining the temporal base layer for each corresponding spatial layer includes receiving a first key frame as the temporal base layer for a first spatial layer and a second key frame as the temporal base layer for a second spatial layer.

In some examples, a number of time slots for the plurality of temporal time slots of the temporal period is equal to $2^{(i-1)}$ where i corresponds to a number of the temporal layers. Alternatively, a number of temporal time slots for the plurality of temporal time slots during the temporal period is independent of a number of the temporal layers. In additional examples, at each spatial layer, the temporal period includes a plurality of hierarchical temporal layers that include at least one temporal layer predicted from a non-base temporal layer. In these additional examples, the hierarchical temporal layers of the temporal period may optionally be configured to provide a scalable frame rate for a bit stream that includes the temporal layer prediction pattern.

In some implementations, a number of spatial layers scaled from the input video stream is independent from a number of temporal time slots for the plurality of temporal time slots during the temporal period. Additionally or alternatively, aligning the temporal base layer for each corresponding spatial layer distributes a bit rate allocated across all temporal time slots during the temporal period.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
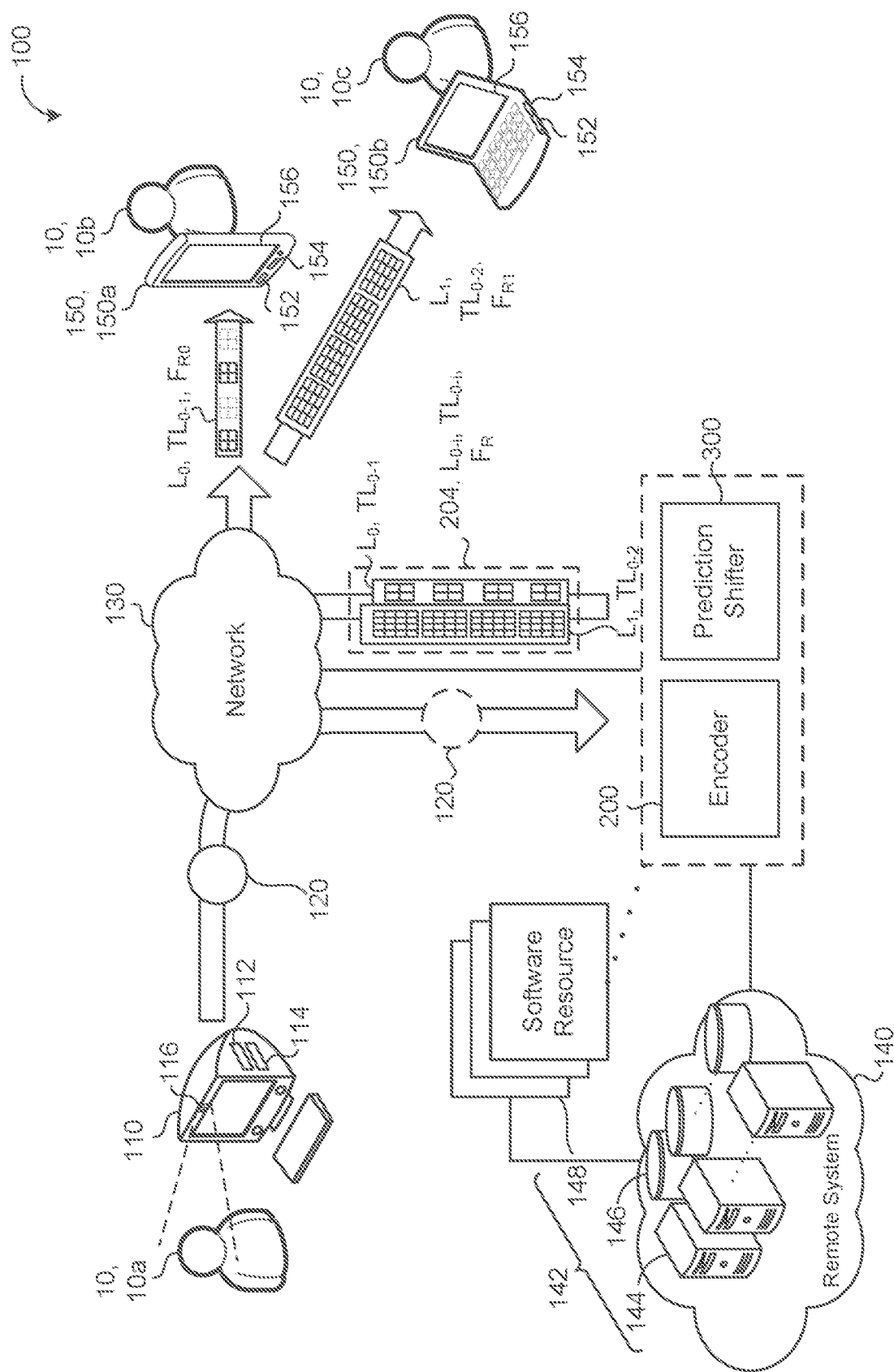
FIG. 1 is a schematic view of an example temporal prediction system.

FIG. 1 is an example of a temporal prediction system 100. The temporal prediction system 100 generally includes a video source device 110 communicating a captured video as a video input signal 120 via a network 130 to a remote system 140. At the remote system 140, an encoder 200 with the aid of a prediction shifter 300 converts the video input signal 120 into an encoded bit stream 204 (also referred to as 'encoded video bit stream'). The encoded bit stream 204 includes more than one spatial layer $L_{0-i}$ where i designates the number of spatial layers $L_{0-i}$. Each spatial layer L is a scalable form of the encoded bit stream 204. A scalable video bit stream refers to a video bit stream where parts of the bit stream may be removed in a way that results in a sub-stream (e.g., a spatial layer L with temporal layer(s) TL) that forms a valid bit stream for some target decoder. In some examples, a sub-stream represents the source content (e.g., captured video) of the original video input signal 120 with a reconstruction quality that is less than the quality of the original captured video. For example, the first spatial layer $L_1$ has a 720p high definition (HD) resolution of 1280×720 while a base spatial layer $L_0$ scales to a resolution of 640×360 as an extended form of video graphics adapter resolution (VGA). Additionally or alternatively, the sub-stream represents the source content (e.g., captured video) of the original video input signal 120 temporally scaled with temporal layers TL at a frame rate that is lower than the frame rate of the originally captured video. In terms of scalability, generally a video may be scalable temporally (e.g., by frame rate), spatially (e.g., by spatial resolution), and/or by quality (e.g., by fidelity often referred to as signal-to-noise-ratio SNR).

The temporal prediction system 100 is an example environment where a user 10, 10a captures video at the video source device 110 and communicates the captured video to other users 10, 10b-c. Here, prior to the users 10b, 10c receiving the captured video via video receiving devices 150, 150a-b, the encoder 200 and the prediction shifter 300 convert the captured video into the encoded bit stream 204. Each video receiving device 150 may be configured to receive and/or to process different video resolutions or different frame rates. Here, a spatial layer L having a layer number i of greater value is associated with a greater resolution than a resolution associated with a spatial layer L having a layer number i of lesser value, such that i=0 refers to a base spatial layer $L_0$ with the lowest scalable resolution within the encoded bit stream 204 of more than one spatial layer $L_{0-i}$. Similarly, the greater the number of temporal layers $TL_{0-i}$ of the encoded bit stream 204 the greater the frame rate $F_R$ of the encoded bit stream 204. In other words, the temporal layers $TL_{0-i}$ of an encoded bit stream 204 are indicative of or proportional to a frame rate of the encoded bit stream 204. Much like the spatial layers $L_{0-i}$, the temporal layers $TL_{0-i}$ have a temporal base layer $TL_0$ where i=0. For scalable video coding, the temporal base layer $TL_0$ is referred to as a base layer because the temporal base layer $TL_0$ is generally predictive of the other temporal layers TL. For instance, the encoder 200 uses the temporal base layer $TL_0$ as a reference to predictively form, for example, a first temporal layer $TL_1$.

With continued reference to FIG. 1, the example shows the encoded video bit stream 204 including two spatial layers $L_0$, $L_1$ and three temporal layers $TL_{0-2}$. As such, one video receiving device 150 may receive the video content as a lower resolution spatial layer $L_0$ at a lower frame rate $F_R$ while another video receiving device 150 may receive the video content as a higher resolution spatial layer $L_1$ with a greater frame rate $F_R$. For example, FIG. 1 depicts a first video receiving device 150a of the user 10b as a cell phone receiving the lower spatial resolution layer $L_0$ at a frame rate $F_{R0}$ associated with two temporal layers $TL_0$, $TL_1$ while the user 10c with a second receiving device 150b as a laptop receives a higher resolution spatial layer $L_1$ at a greater frame rate $F_{R1}$ associated with three temporal layers $TL_{0-2}$.

The video source device 110 can be any computing devices or data processing hardware capable of communicating captured video and/or video input signals 120 to a network 130 and/or remote system 140. In some examples, the video source device 110 includes data processing hardware 112, memory hardware 114, and a video capturing device 116. In some implementations, the video capturing device 116 is actually an image capturing device that may communicate a sequence of captured images as video content. For example, some digital cameras and/or webcams are configured to capture images at a particular frequency to form perceived video content. In other examples, the video source device 110 captures video in a continuous analogue format that may subsequently be converted to a digital format. In some configurations, the video source device 110 includes an encoder to initially encode or compress captured data (e.g., analogue or digital) to a format further processed by the encoder 200. In other examples, the video source device 110 is configured to access the encoder 200 at the video source device 110. For example, the encoder 200 is a web application hosted on the remote system 140 yet accessible via a network connection by the video source device 110. In yet other examples, parts or all of the encoder 200 and/or prediction shifter 300 are hosted on the video source device 110. For example, the encoder 200 and the prediction shifter 300 are hosted on the video source device 110, but the remote system 140 functions as a backend system that relays the bit stream including spatial layers $L_{0-i}$ and temporal layers $TL_{0-i}$ to video receiving device(s) 150 in accordance with decoding capabilities of the video receiving device(s) 150 and a capacity of a connection of the network 130 between the video receiving device(s) 150 and the remote system 140. Additionally or alternatively, the video source device 110 is configured such that the user 10*a* may engage in communication to another user 10*b-c* across the network 130 utilizing the video capturing device 116.

The video input signal 120 is a video signal corresponding to captured video content. Here, the video source device 110 captures the video content. For example, FIG. 1 depicts the video source device 110 capturing the video content via a webcam 116. In some examples, the video input signal 120 is an analogue signal that is processed into a digital format by the encoder 200. In other examples, the video input signal 120 has undergone some level of encoding or digital formatting prior to the encoder 200, such that the encoder 200 performs an additional level of encoding.

Much like the video source device 110, the video receiving devices 150 can be any computing devices or data processing hardware capable of receiving communicated captured video via a network 130 and/or remote system 140. In some examples, the video source device 110 and the video receiving device 150 are configured with the same functionality such that the video receiving device 150 may become a video source device 110 and the video source device 110 may become a video receiving device 150. In either case, the video receiving device 150 includes at least data processing hardware 152 and memory hardware 154. Additionally, the video receiving device 150 includes a display 156 configured to display the received video content (e.g., at least one spatial layer L of the encoded bit stream 204). As shown in FIG. 1, a user 10*b*, 10*c* receives the encoded bit stream 204 at a frame rate $F_R$ as a spatial layer L and decodes and displays the encoded bit stream 204 as a video on the display 156. In some examples, the video receiving device 150 includes a decoder or is configured to access a decoder (e.g., via the network 130) to allow the video receiving device 150 to display content of the encoded bit stream 204.

In some examples, the encoder 200 and/or the prediction shifter 300 is an application hosted by a remote system 140, such as a distributed system of a cloud environment, accessed via the video source device 110 and/or the video receiving device 150. In some implementations, the encoder 200 and/or the prediction shifter 300 is an application downloaded to memory hardware 114, 154 of the video source device 110 and/or the video receiving device 150. Regardless of an access point to the encoder 200 and prediction shifter 300, the encoder 200 and/or the prediction shifter 300 may be configured to communicate with the remote system 140 to access resources 142 (e.g., data processing hardware 144, memory hardware 146, or software resources 148). Access to resources 142 of the remote system 140 may allow the encoder 200 and the prediction shifter 300 to encode the video input signal 120 into the encoded bit stream 204 and/or generate temporal layer(s) TL to each spatial layer L of the more than one spatial layer $L_{0-i}$ of the encoded bit stream 204. Optionally, a real time communication (RTC) application, as a software resource 148 of the remote system 140 used to communicate between users 10, 10*a-c*, includes the encoder 200 and/or the prediction shifter 300 as built-in functionality.

The remote system 140 may function as a central router. As a central router, the remote system 140 may determine that a video receiving device 150 does not have the bandwidth to receive all the temporal layers $TL_{0-i}$ (e.g., not able to receive a frame rate of sixty frames per second). The encoded bit stream 204 includes information about the temporal dependencies of each temporal layer TL such that the central router can scale the encoded bit stream 204 for the video receiving device 150. For instance, FIG. 1 illustrates that the second user 10*b* receives the encoded bit stream 204 as the base spatial layer $L_0$ with temporal layers $TL_{0-1}$ such that the received frame rate $F_{R0}$ at the first video receiving device 150*a* is scaled (e.g., from sixty frames per second to thirty frames per second) according to the temporal dependencies within the information of the encoded bit stream 204.

Referring in further detail to FIG. 1, three users 10, 10*a-c* communicate via a RTC application (e.g., a WebRTC video application hosted by the cloud) hosted by the remote system 140. In this example, the first user 10*a* is group video chatting with the second user 10*b* and the third user 10*c*. As the video capturing device 116 captures video of the first user 10*a* talking, the captured video via a video input signal 120 is processed by the encoder 200 and the prediction shifter 300 and communicated to the other users 10*b*, 10*c* via the network 130. Here, the encoder 200 and the prediction shifter 300 operate in conjunction with the RTC application to generate an encoded bit stream 204 with more than one spatial layer $L_0$, $L_1$ where each spatial layer L has temporal layers $TL_{0-2}$ based on the video input signal 120. Due to the capabilities of each video receiving device 150*a*, 150*b*, each user 10*b*, 10*c*, receiving the video of the first user 10*a* chatting, receives a different scaled version of the original video corresponding to the video input signal 120. For example, the second user 10*b* receives the base spatial layer $L_0$ with two temporal layers $TL_0$, $TL_1$ at a first frame rate $FR_0$ (e.g., thirty frames per second) while the third user 10*c* receives the first spatial layer $L_1$ with three temporal layers $TL_{0-2}$ at a second frame rate $FR_1$ (e.g., sixty frames per second). Each user 10*b*, 10*c* proceeds to display the received video content on a display 156 communicating with the RTC application. Although, a RTC communication application is shown, the encoder 200 and the prediction shifter 300 may be used in other applications involving encoded bit streams 204 with temporal layers $TL_{0-i}$.

Figure 2:
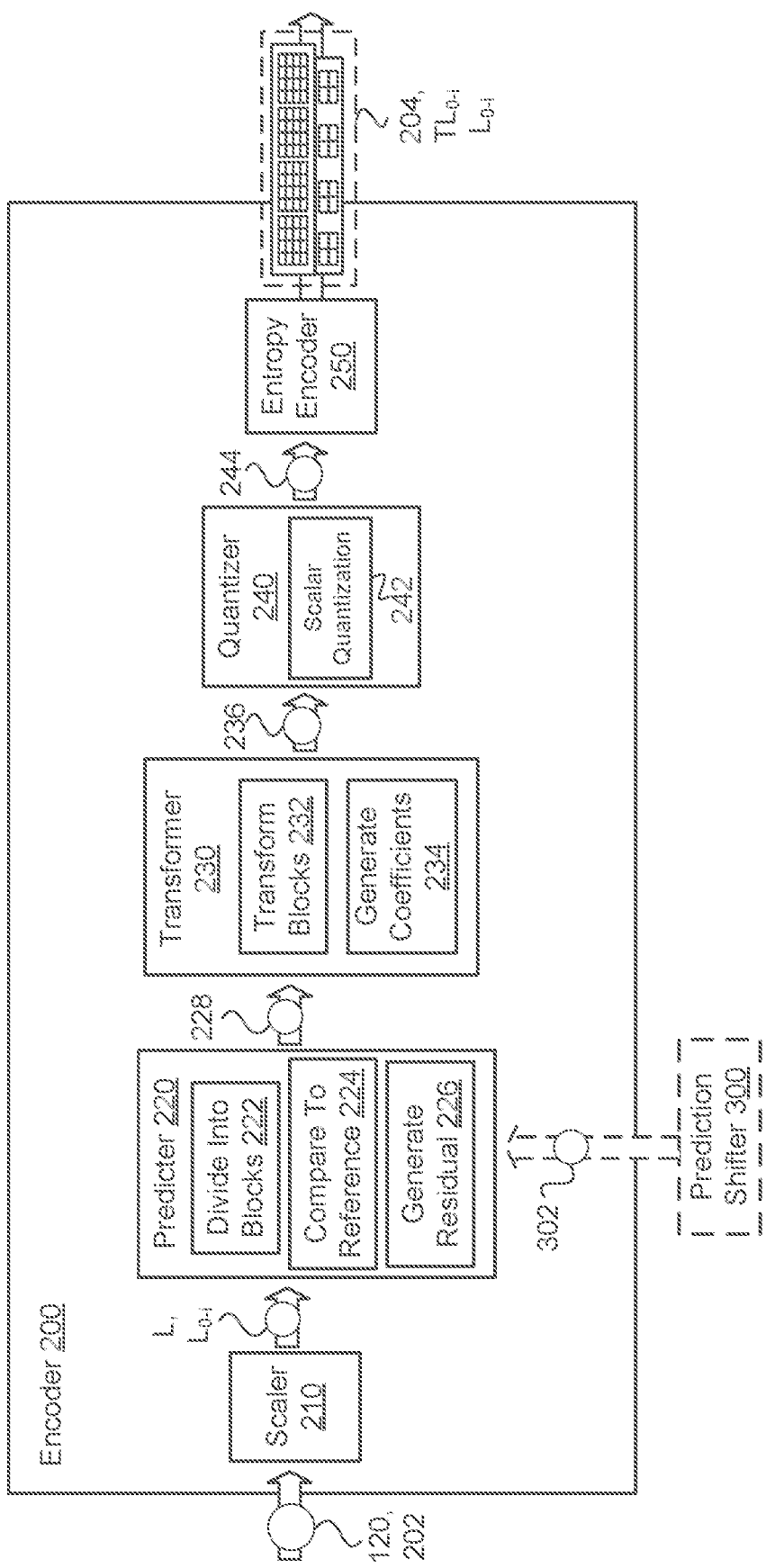
FIG. 2 is a schematic view of an example encoder within the temporal prediction system of FIG. 1.

FIG. 2 is an example of an encoder 200. The encoder 200 is configured to convert the video input signal 120 as an input 202 into an encoded bit stream as an output 204. Although depicted individually, the encoder 200 and the prediction shifter 300 may be integrated into a single device (e.g., as shown by the dotted line in FIG. 1) or occur separately across multiple devices (e.g., the video input device 110, the video receiving device 150, or the remote system 140). The encoder 200 generally includes a scaler 210, a predictor 220, a transformer 230, a quantizer 240, and an entropy encoder 250. Though not shown, the encoder 200 may include additional components to generate an encoded bit stream 204.

The scaler 210 is configured to scale the video input signal 120 into a plurality of spatial layers $L_{0-i}$. In some implementations, the scaler 210 scales the video input signal 120 by determining portions of the video input signal 120 that may be removed to reduce a spatial resolution. This process of forming a spatial layer L with lower resolution may be referred to as downsampling. Conversely, the scaler 210 may scale the video input signal 120 by upsampling in order to predict a spatial layer L of greater resolution (e.g., forms a first spatial layer $L_1$ from a base spatial layer $L_0$). By removing a portion or predicting a portion, the scaler 210 forms versions of the video input signal 120 to form a plurality of spatial layers (e.g., substreams). In some examples, the scaler 210 may repeat this process until the scaler 210 forms a base spatial layer $L_0$. For instance, the scaler 210 scales the video input signal 120 to form a set number of spatial layers $L_{0-i}$. In other examples, the scaler 210 is configured to scale the video input signal 120 until the scaler 210 determines that no decoder exists to decode a substream. When the scaler 210 determines that no decoder exists to decode a substream corresponding to the scaled version of the video input signal 120, the scaler 210 identifies the previous version (e.g., spatial layer L) as the base spatial layer $L_0$. In some implementations, scalers 210 are used in conjunction with (e.g., generate an input to an encoder) or part of (e.g., allow scaling to serve as a reference frame for a frame being encoded) codecs corresponding to a scalable video coding (SVC) extensions, such as an extension of the H.264 video compression standard or an extension of the VP9 coding format.

The predictor 220 is configured to receive each spatial layer L corresponding to the video input signal 120 from the scaler 210. For each spatial layer L, the predictor 220, at operation 222, partitions the corresponding spatial layer L into sub-blocks. With sub-blocks, the predictor 220, at operation 224, compares the sub-blocks to a previously encoded reference image or frame. Here, the reference frame may be a prediction of a frame (e.g., motion compensated or intra-frame predicted). The reference frame may be cached in the encoder 200 (e.g., like a circular buffer) to enable efficient encoding. Based on the comparison of the sub-blocks to the reference frame, at operation 226, the predictor 220 generates a residual 228. The residual 228 generally refers to a difference between an input frame or scaled version thereof (i.e. image) and the reference frame (e.g., a prediction of a frame formed by the encoder 200). With the residual 228, the encoder 200 may require fewer bits to encode than the original frame. For example, if an image from frame to frame stays nearly the same (e.g., has minimal sub-block differences), the residual 228 that results will generate a large amount of zero-valued transform coefficients for the identical sub-blocks between the reference frame and the input frame. Large numbers of zero-valued transform coefficients may be efficiently compressed into a low bit rate bit stream by the entropy encoder. As an example, the first user 10a while chatting only moves his/her lips and facial muscles while the background behind the first user 10a does not change. From frame to frame, the sub-blocks of the video captured for the background behind the first user 10a are identical. Therefore, a reference frame cached in the encoder 200 may have the same background and substantially fewer bits are required (e.g., just the differences corresponding to the lips and facial muscle movement) to encode the frame beyond the reference image.

In some configurations, the predictor 220 is configured to reference a particular frame as the reference frame (i.e. a prediction of a frame). For example, the encoder 200 stores a buffer of reference frames such that the predictor 220 determines a closest match of the input frame and generates the residual 228 based on the closest match. In some implementations, a prediction pattern designates to the predictor 220 which frame in a buffer of the encoder 200 to use as the reference frame to form the residual 228. For instance, as shown in FIG. 2, the prediction shifter 300 communicates to the predictor 220 a temporal layer prediction pattern 302 that identifies which temporal layer TL (i.e. reference frame) to use to form temporal layers $TL_{0-i}$ for the encoded bit stream 204.

The transformer 230 is configured to receive to receive the residual 228 from the predictor 220. With the residual 228, at operation 232, the transformer 230 transforms each sub-block of the residual 228 to generate, at operation 234, transform coefficients 236 (e.g., by discrete cosine transform (DCT)). By generating transform coefficients 236, the transformer 230 may aid in the removal of redundant video data.

The quantizer 240 is configured to perform a quantization or a re-quantization process 242 (i.e., scalar quantization). A quantization process generally converts input parameters (e.g., from a continuous analogue data set) into a smaller data set of output values. Although a quantization process may convert an analogue signal into a digital signal, here, the quantization process 242 (also sometimes referred to as a requantization process) typically further processes a digital signal. Depending on a form of the video input signal 120, either process may be used interchangeably. By using a quantization or re-quantization process, data may be compressed, but at a cost of some aspect of data loss since the smaller data set is a reduction of a larger or continuous data set. Here, the quantization process 242 converts a digital signal. In some examples, the quantizer 240 contributes to the formation of the encoded bit stream 204 by scalar quantizing the transform coefficients 236 of each sub-block of the corresponding spatial layer L from the transformer 230 into quantization indices 244. For instance, scalar quantizing the transform coefficients 236 may remove redundant and/or data whose removal will minimally affect the fidelity of the decoded frame.

The entropy encoder 250 is configured to convert the quantization indices 244 (i.e. quantized transform coefficients) and side information into bits. By this conversion, the entropy encoder 250 forms the encoded bit stream 204. In some implementations, the entropy encoder 250 along with the quantizer 240 enable the encoder 200 to form an encoded bit stream 204 with each layer $L_{0-i}$ including temporal layers $TL_{0-i}$. In other words, the entropy encoder 250 forms an encoded bit stream 204 that is at least scalable spatially (i.e. by spatial layers $L_{0-i}$) and temporally (i.e. by temporal layers $TL_{0-i}$).

Figure 3A:
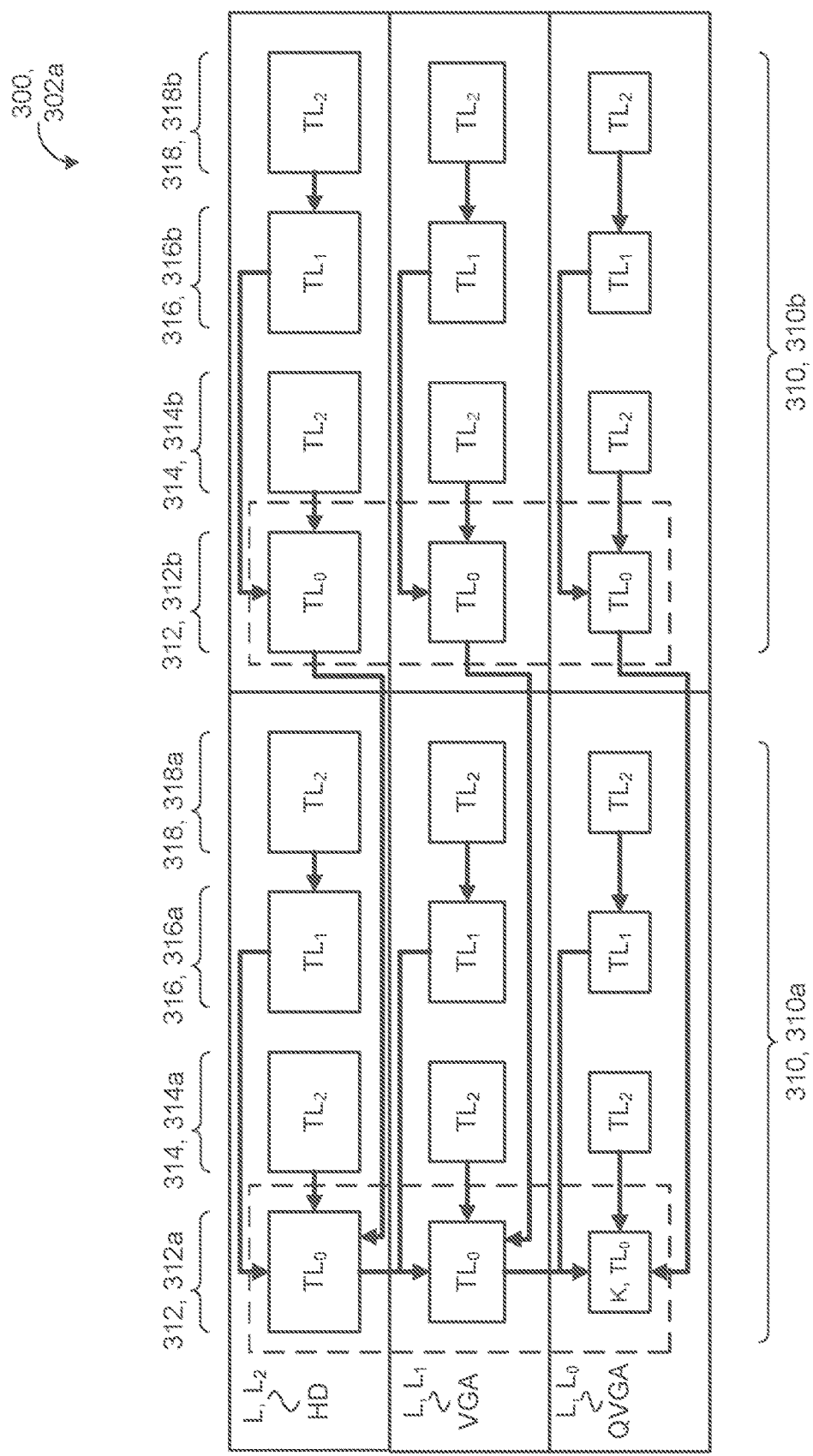
FIG. 3A is a schematic view of an example predictor with a non-shifted prediction pattern within the temporal prediction system of FIG. 1.
Figure 3B:
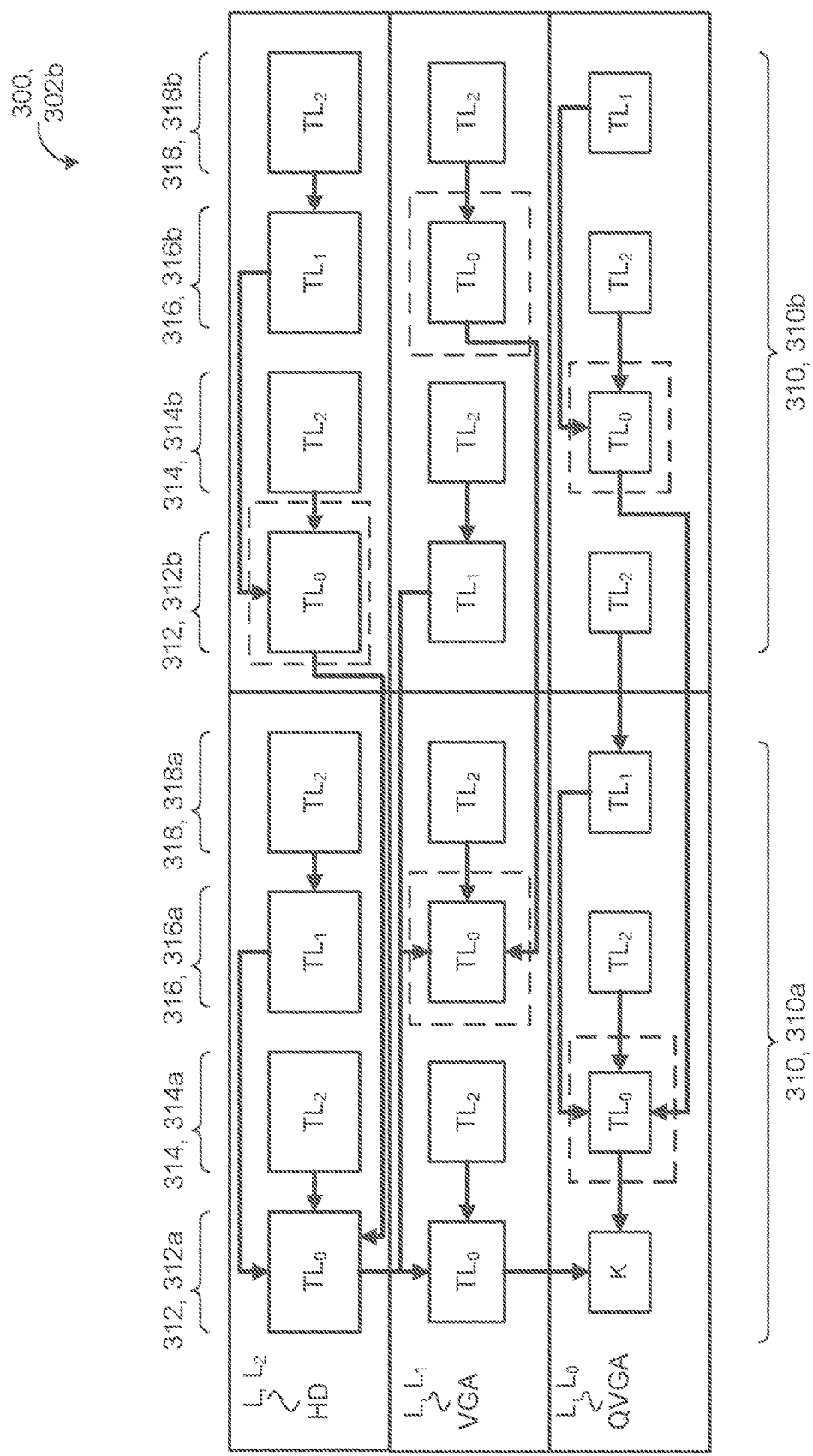
FIGS. 3B-3C are schematic views of example predictors with a shifted prediction pattern within the temporal prediction system of FIG. 1.
Figure 3C:
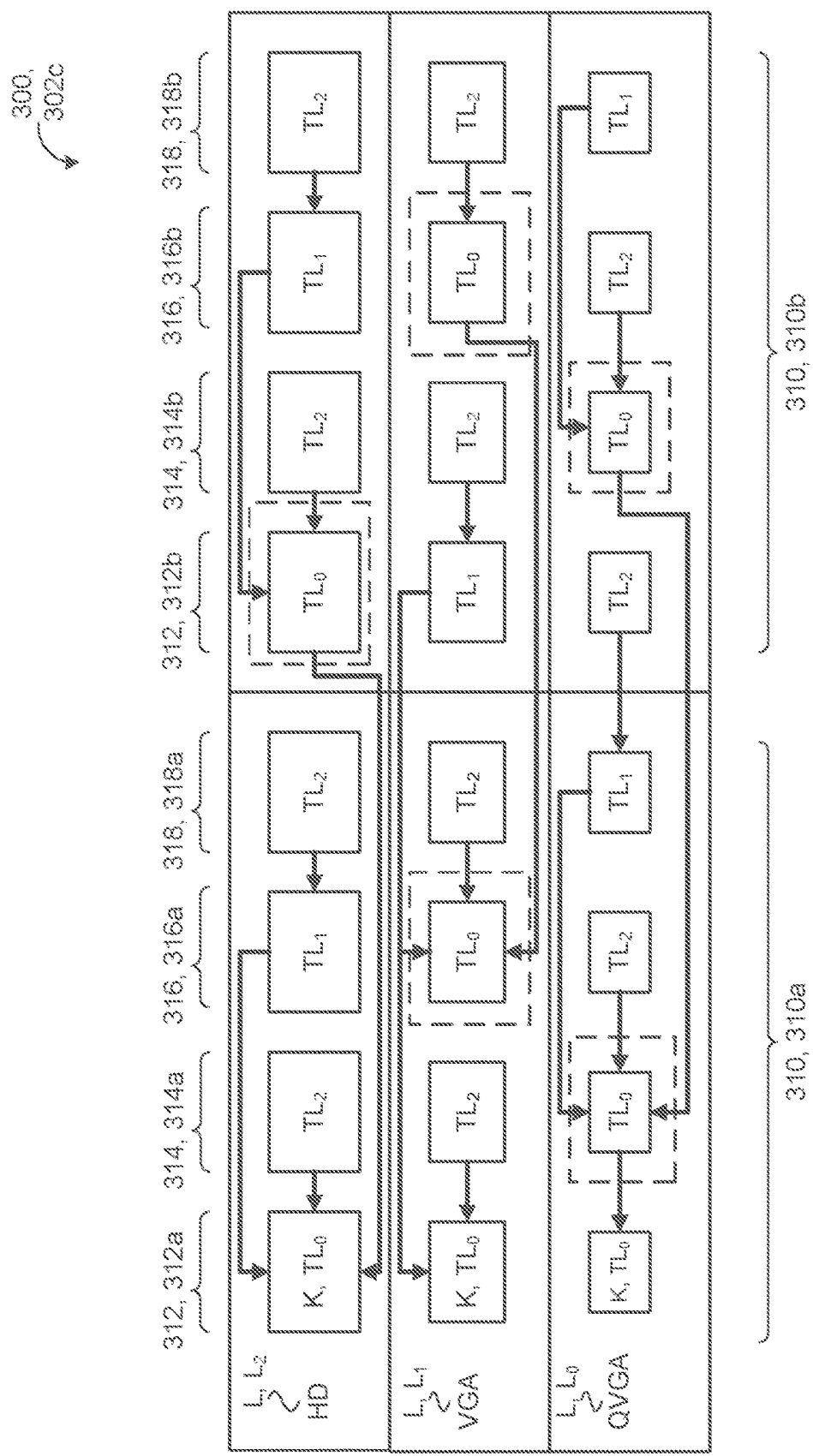

FIGS. 3A-3C are examples of temporal layer prediction patterns 302, 302a-c for the prediction shifter 300. Each temporal layer prediction pattern 302 may be used by the predicter 220 of the encoder 200 to form a temporal layer TL of the encoded bit stream 204. In the examples shown by FIGS. 3A-3C, the temporal layer prediction pattern 302 includes three spatial layers $L_{0-2}$. Here, the three spatial layers include a base spatial layer $L_0$ corresponding to Quarter Video Graphics Array (QVGA) resolution, a first spatial layer $L_1$ corresponding to Video Graphics Array (VGA) resolution, and a second spatial layer $L_2$ corresponding to High Definition (HD) resolution. In these examples, each frame, represented by a square, is sized to indicate the resolution hierarchy between the spatial layer $L_{0-2}$. Although three spatial layers are shown, any number of spatial layers $L_{0-i}$ may use the temporal layer prediction pattern 302 (e.g., a fourth spatial layer $L_3$ corresponding to Ultra-High Definition (UHD)).

Each example includes two temporal periods 310, 310a-b to illustrate the temporal layer prediction pattern 302. Even though two temporal periods 310a-b are shown, the encoder 200 may repeat the temporal periods 310 of the temporal layer prediction patterns 302 as necessary to encode captured video (e.g., the video input signal 120). Each temporal period 310 includes at least one temporal layer TL. Generally, a temporal layer TL refers to a prediction structure for a frame of video content at a particular time within the encoded bit stream 204 that corresponds to a particular spatial layer L. In FIGS. 3A-3C, each arrow represents the prediction reference structure for a temporal layer TL and/or a spatial layer L. More particularly, the arrow points to the reference temporal layer TL used to predict the particular temporal layer TL stemming from the arrow (e.g., in FIG. 3A, the first temporal layer $TL_1$ uses the base temporal layer $TL_0$ as a prediction reference).

Temporal layering allows the encoded bit stream 204 to be scaled temporally based on the interdependencies of each temporal layer TL. In some examples, these interdependencies form temporal layers $TL_{0-i}$ that are hierarchical. For instance, if the frame rate $F_R$ for the temporal layers TL is sixty frames per second, the encoded bit stream 204 may be scaled to thirty frames per second by removing packets of the encoded bit stream 204 associated with the second temporal layer $TL_2$. With reference to FIG. 3A, removal of the second temporal layer $TL_2$ would result in a bit stream with every other frame. For instance, when the presence of all three temporal layers $TL_{0-2}$ corresponds to a frame rate $F_R$ of sixty frames per second, removal of the second temporal layer $TL_2$ results in a frame rate $F_R$ equivalent to thirty frames per second frame rate. Similarly, removal of the first temporal layer $TL_1$ (in addition to removing the second temporal layer $TL_2$) results in an encoded bit stream 204 where the encoder 200 encodes every fourth frame (i.e. provides a fifteen frames per second structure). In some implementations, removing temporal layers $TL_{0-i}$ out of order (e.g., removing the first temporal layer $TL_1$ before the second temporal layer $TL_2$) breaks the hierarchical prediction structure (i.e. dependencies) for the encoder/decoder.

Traditionally, a temporal base layer $TL_0$ initializes a temporal layer prediction pattern 302. During temporal layer prediction, a temporal layer TL relies or uses information from another part of the bit stream (e.g., another frame). Each temporal period 310 includes a temporal base layer $TL_0$ to form the prediction reference for the temporal layers $TL_{0-i}$ of the temporal period 310. For an encoded bit stream 204 with more than one spatial layer L (e.g., a base spatial layer $L_0$ and a first spatial layer $L_1$), the encoder 200 may build the reference structure for each spatial layer L or may receive the reference structure for each spatial layer L (e.g., simulcast video encoding). In some examples, the encoder 200 builds each spatial layer L from a single key frame K. The key frame K is a temporal base layer $TL_0$ that starts or reinitializes encoding prediction and is the building block for the reference structure of each spatial layer L. Often the key frame K is allocated a large bit rate because the prediction quality depends on the key frame K for the prediction pattern. In some configurations, the encoder 200 performs key scalable video encoding (kSVC shown in FIGS. 3A and 3B) where the encoder 200 receives a key frame K for a first spatial layer and predicts a second spatial layer based on the key frame K. More specifically, an upsampled version of the first spatial layer $L_1$ is used as a reference frame to encode the second spatial layer $L_2$. When the predicted second spatial layer based on the key frame K is of greater resolution than the first spatial layer (as shown in FIGS. 3A and 3B), the prediction process is referred to as upsampling from the key frame K to form the second spatial layer (e.g., to predict the first spatial layer $L_1$ corresponding to VGA from the base spatial layer $L_0$ corresponding to QVGA). In other configurations, such as FIG. 3C, the encoder 200 performs simulcast video encoding where the encoder 200 receives the temporal base layer $TL_0$ for each spatial layer L as a key frame K as part of the initiation (or reinitiation). In other words, during initiation each spatial layer L receives a key frame K to start the temporal prediction pattern 302.

FIG. 3A depicts a traditional temporal prediction pattern 302a in which spatial prediction (e.g., represented by arrows pointed downward) is used only in time slots in which the spatial base layer $L_0$ is coded as a key frame K. Here, the temporal prediction pattern 302a has three spatial layers $L_{0-2}$ associated with a temporal period 310 having four temporal time slots 312, 314, 316, 318. In some examples, the number i of spatial layers $L_{0-i}$ is independent of a number of temporal time slots for a plurality of temporal time slots. In some implementations, the number i of temporal layers $TL_{0-i}$ is independent of a number of temporal time slots for a plurality of temporal time slots of the temporal period 310. In other implementations, the number of temporal time slots for the plurality of temporal time slots of the temporal period 310 is equal to $2^{(i-1)}$ where i corresponds to the number of temporal layers $TL_{0-(i-1)}$ within the temporal layer prediction pattern 302. For the temporal prediction pattern 302a of FIG. 3A, each temporal time slot 312-318 aligns the same temporal layer TL across all the spatial layers $L_{0-2}$. In other words, a first temporal time slot 312a in a first temporal period 310a aligns all the temporal base layers $TL_0$ for each spatial layer $L_{0-2}$, a second temporal time slot 314a in the first temporal period 310a aligns all the second temporal layers $TL_2$ for each spatial layer $L_{0-2}$, a third temporal time slot 316a in the first temporal period 310a aligns all the first temporal layers $TL_1$ for each spatial layer $L_{0-2}$, and a fourth temporal time slot 318a in the first temporal period 310a aligns all the second temporal layers $TL_2$ for each spatial layer $L_{0-2}$. This traditional temporal prediction pattern 302a is problematic because its structure results in packets of the encoded bit stream 204 being vulnerable to packet error.

During the sending and/or the receiving of the encoded bit stream 204, network resources and/or device resources (e.g., of the video source device 110 or the video receiving device 150) may encounter transmission limitations that result in transmission issues. When these issues occur, packets of data (i.e. the encoded bit stream 204) may be subject to transmission errors. Generally speaking, if a packet gets lost, a decoder can typically recover from the packet error of a lost packet when the packet error affects non-base temporal layers. However, when the lost packet(s) corresponds to the temporal base layer $TL_0$, it is a non-recoverable loss that requires retransmission of the lost data or reinitialization because the temporal prediction pattern 302a relies on the temporal base layer $TL_0$ for encoding and decoding (i.e. has prediction interdependencies).

The vulnerability to packet loss may further compound when burst errors occur. Burst errors occur when multiple consecutive packets are lost. For perspective, even though a transmission may have a 1% packet loss on average, the transmission may lose five or ten packets in a row as a burst error. When a burst error affects the packets of the temporal base layer $TL_0$, the alignment of all the temporal base layers $TL_0$ for each spatial layer L within a temporal time slot (e.g., temporal time slot 312a, 312b shown by the dotted boxes) in the traditional temporal prediction pattern 302a is particularly problematic because it increases the likelihood that more than one spatial layer L of scalable video cannot be decoded without retransmission or reinitiation. For example, when all temporal base layers $TL_0$ are affected by a burst error, a receiver receiving more than one spatial layer $L_{0-i}$ (e.g., for error resilience purposes) cannot switch to a second, back-up spatial layer while the first spatial layer $L_1$ is recovered. In some instances, the reality is that a network connection of poor quality that experienced issues resulting in the burst error now has to bear the burden of retransmission or reinitiation (e.g., further network congestion). This burden may result in further issues because the temporal base layers $TL_0$ intentionally receive a greater bit rate than other temporal layers in order to produce frame of higher quality since temporal prediction pattern 302 relies on the temporal base layer $TL_0$ to directly or indirectly serve as a reference to all frames. The temporal base layer $TL_0$ often receives a large amount of bit rate because video quality leaks throughout the predictions of temporal layers $TL_{0-i}$. For example, although in FIGS. 3A-3C the temporal base layer $TL_0$ is ¼ of the temporal period 310, the temporal base layer $TL_0$ typically receives ½ of the bit rate for the temporal period 310.

FIGS. 3B and 3C depict temporal prediction patterns 302b-c that have similar temporal prediction patterns 302 except for the formation of the spatial layers $L_{0-i}$. Here, the prediction shifter 300 generates each temporal prediction pattern 302b-c where the temporal base layers $TL_0$ are unaligned (e.g., as shown by the dotted boxes associated with the temporal base layers $TL_0$) at temporal period time slots 312-318 (except for the initial first temporal period time slot 312a of first temporal period 310a containing the key frame K) for each of the spatial layers $L_{0-2}$. In examples where there are more spatial layers $L_{0-i}$ than temporal layers $TL_{0-i}$, some alignment may exist between the temporal base layers $TL_0$, but the prediction shifter 300 will attempt to minimize the amount of alignment.

In some configurations, the prediction shifter 300 generates the temporal layer prediction patterns 302b-c for a first spatial layer (e.g., the base spatial layer $L_0$) and a second spatial layer (e.g., the first spatial layer $L_1$) by using the temporal period 310 with at least one temporal layer TL and at least one temporal time slot (e.g., the first temporal time slot 312). Here, like FIG. 3A, each of the first temporal period 310a and the second temporal period 310b include three temporal layers $TL_{0-2}$ with four temporal period time slots 312-318. In these examples, each temporal layer TL is associated with a temporal time slot. Furthermore, one of the temporal layers TL of each temporal period 310 includes the temporal base layer $TL_0$ for each spatial layer L. With the inclusion of the temporal base layer $TL_0$, each temporal period 310 is able to include additional temporal layers TL. To form the temporal layer prediction patterns 302b-c, the prediction shifter 300 shifts the temporal base layer $TL_0$ for the first spatial layer $L_0$ (e.g., the temporal base layer $TL_0$ for the first spatial layer $L_0$ corresponding to QVGA) from the first temporal time slot 312a, 312b of FIG. 3A to the second temporal time slot 314a, 314b. Similarly, the prediction shifter 300 shifts the temporal base layer $TL_0$ for the second spatial layer $L_1$ (e.g., the temporal base layer $TL_0$ for the second spatial layer $L_1$ corresponding to VGA) from the first temporal time slot 312a, 312b of FIG. 3A to the third temporal time slot 316a, 316c. As shown by the dotted boxes around the temporal base layers $TL_0$, no temporal time slot 312-318 includes more than one temporal base layer $TL_0$ other than in the initial first temporal time slot 312a of the first temporal period 310a when initializing the temporal layer prediction patterns 302. For example, each temporal period 310 subsequent to the second temporal period 310b matches the second temporal period 310b, unless reinitiation occurs.

Temporal base layers $TL_0$ typically require more bits and more system resources (e.g., CPU cycles or memory access bandwidth) to encode than frames in other temporal layers $TL_i$. Consequently, in additional to resilience to burst errors, the prediction shifter 300, with temporal layer prediction patterns 302b-c, enables a more even distribution of bit rate and more constant use of system resources within a temporal period 310 (e.g., than the prediction pattern 302a in FIG. 3A). For example, when there are four temporal time slots 312-318 and the frame rate $F_R$ is sixty frames per second, the first temporal time slot 312 occurs at time equals zero seconds. The second temporal time slot 314, the third temporal time slot 316, and the fourth temporal time slot 318 occur at time equals ⅟60 seconds, ²⁄60 seconds, and ³⁄60 seconds respectively. In a traditional prediction pattern, such as temporal layer prediction pattern 302a, at the first temporal time slot 312a, each of the temporal base layers $TL_0$ is encoded causing a large spike in bit rate and the use of system resources required to form the temporal base layers $TL_0$. By shifting the temporal base layers $TL_0$ into non-alignment, the larger bit rate allocated and the higher use of system resourced used to encode the temporal base layer $TL_0$ becomes distributed across all temporal time slots of the temporal period 310 (e.g., a more balanced distribution of bits is sent to the network and a more balanced use of system resources is used at the encoder 200). In some examples, shifting the temporal base layer distributes an average bit rate allocated to each temporal time slot of the temporal period 310. In some configurations, the temporal layer prediction patterns 302b-c reduce system resource bottlenecks resulting from the encoder 200 having to encode temporal base layer frames for all spatial layers $L_{0-i}$ in the same time slot. Additionally or alternatively, the temporal layer prediction patterns 302b-c mitigate packet loss issues by organizing the temporal time slots such that the temporal base layers $TL_0$ for each spatial layer L are intermixed within other temporal layers $TL_{0-i}$ within the encoded bit stream 204; thus, making the packets of the encoded bit stream 204 less susceptible to burst errors. More particularly, when a burst error occurs for the temporal layer prediction patterns 302b-c, the non-alignment of the temporal base layers $TL_0$ decreases the likelihood that more than one spatial layer L will be affected (e.g., require retransmission or reinitiation).

Figure 4:
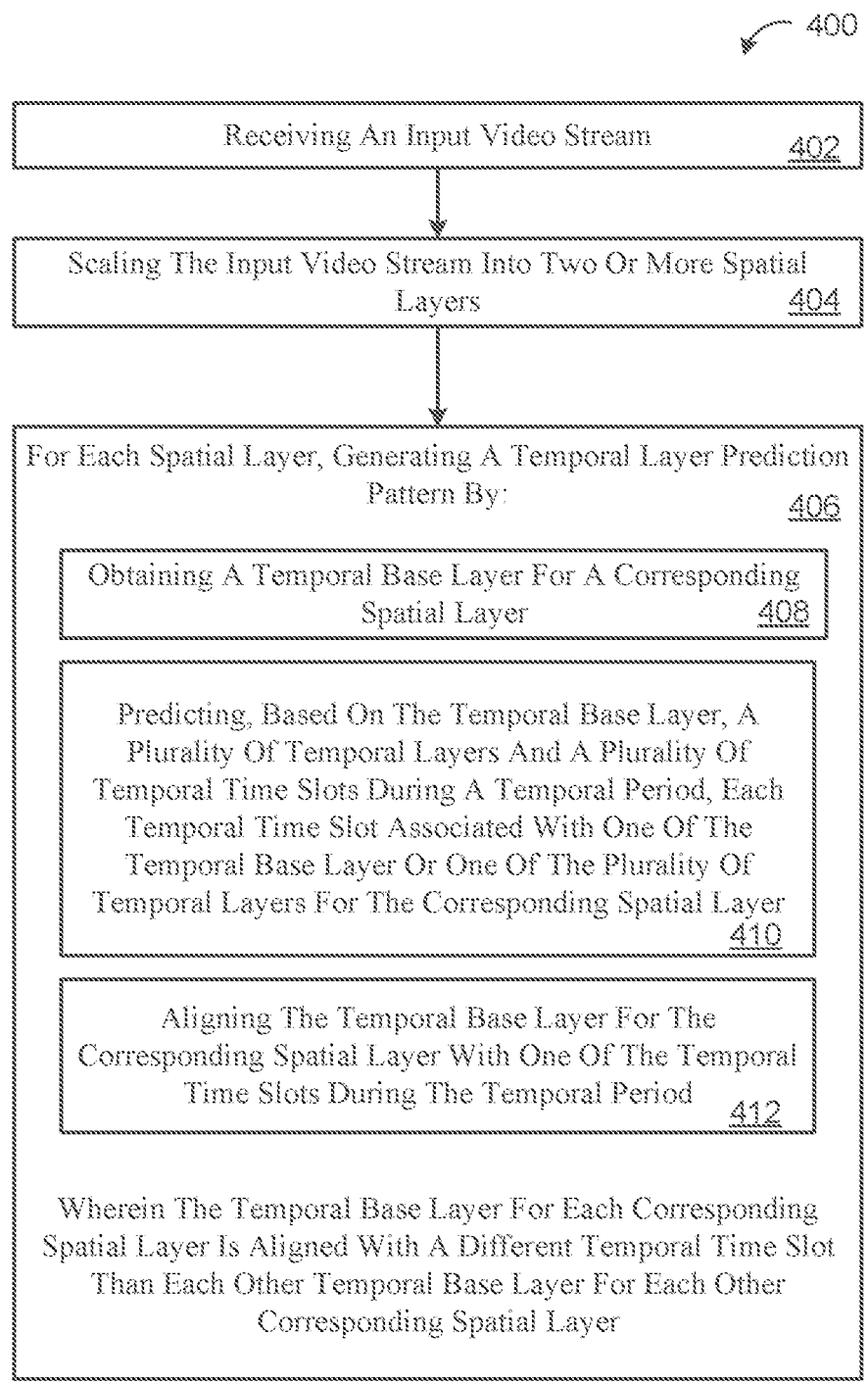
FIG. 4 is a flowchart for an example set of operations for a method of implementing a temporal prediction system.

FIG. 4 is an example of a method 400 for implementing the temporal prediction system 100. At operation 402, the method 400 receives an input video signal 120. At operation 404, the method 400 scales the input video signal 120 into two or more spatial layers $L_{0-i}$. At operation 406, the method 400 generates, for each spatial layer L, a temporal layer prediction pattern 302. To generate the temporal layer prediction pattern 302, at operation 408, the method 400 obtains a temporal base layer $TL_0$ for a corresponding spatial layer L. At operation 410, the method 400 generates the temporal layer prediction pattern 302 by also identifying, based on the temporal base layer $TL_0$, a plurality of temporal layers $TL_{0-i}$ and a plurality of temporal time slots 312-318 during a temporal period 310. Here, each temporal time slot is associated with one of the temporal base layers $TL_0$ or one of the plurality of temporal layers $TL_i$ for the corresponding spatial layer L. At operation 410, the method 400 aligns the temporal base layer $TL_0$ for the corresponding spatial layer L with one of the temporal time slots 312-318 during the temporal period 310 to further generate the temporal layer prediction pattern 302. For generation of the temporal layer prediction pattern 302, the method 400 ensures the temporal base layer $TL_0$ for each corresponding spatial layer L is aligned with a different temporal time slot than each other temporal base layer $TL_0$ for each other corresponding spatial layer L.

Figure 5:
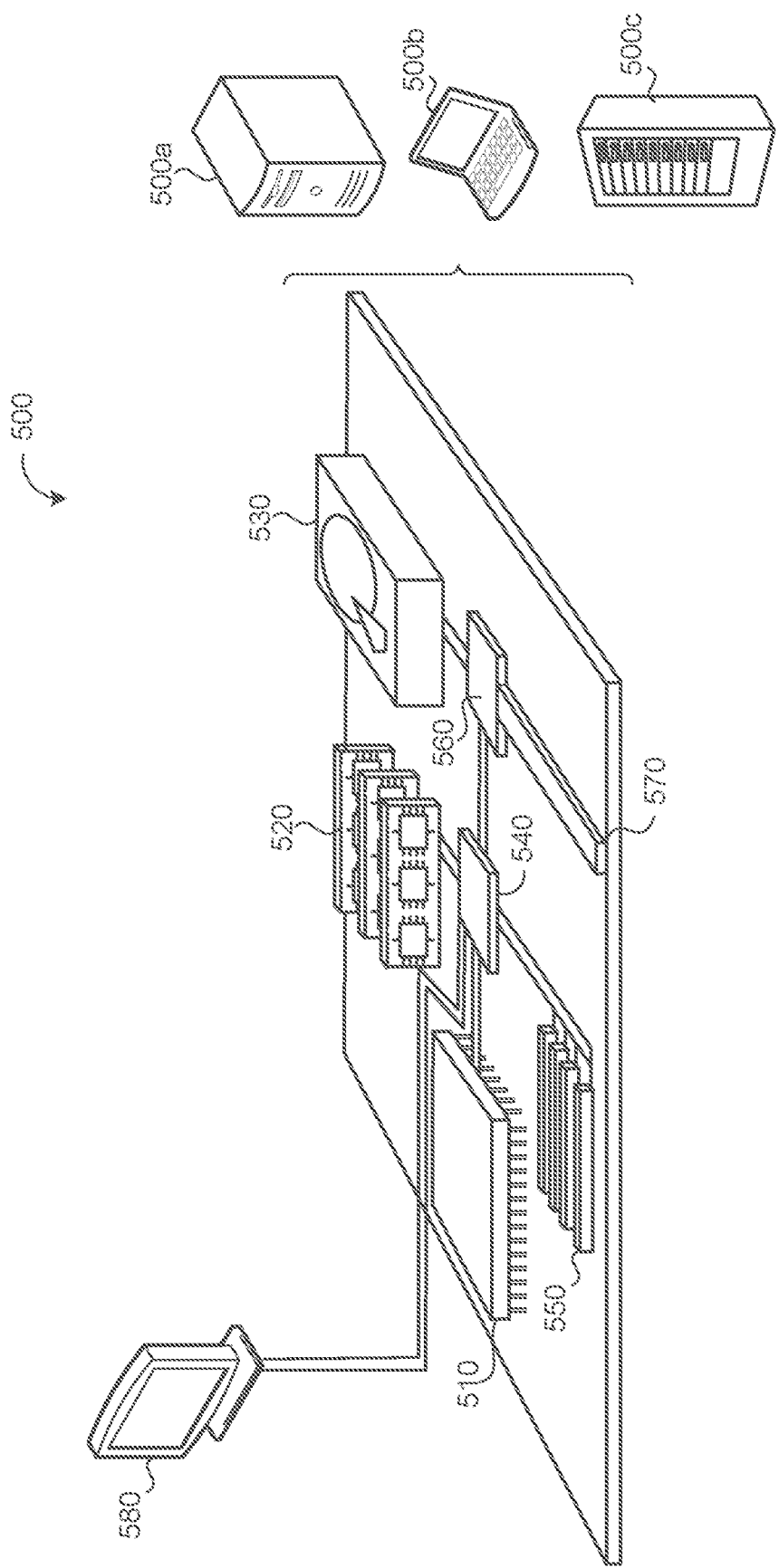
FIG. 5 is a schematic view of an example computing device that may be used to implement the systems and methods described herein.

FIG. 5 is schematic view of an example computing device 500 that may be used to implement the systems and methods (e.g., of the encoder 200 and the prediction shifter 300) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes data processing hardware 510, memory hardware 520, a storage device 530, a high-speed interface/controller 540 connecting to the memory hardware 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The data processing hardware 510 can process instructions for execution within the computing device 500, including instructions stored in the memory hardware 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory hardware 520 stores information non-transitorily within the computing device 500. The memory hardware 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on data processing hardware 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a plurality of data packets corresponding to an encoded video bit stream, the encoded video bit stream scalable into a plurality of spatial layers;
   identifying, by the data processing hardware, a transmission error for a respective data packet of the plurality of data packets, the respective data packet comprising a first temporal base layer for a first spatial layer of the encoded video bit stream, the first temporal base layer occurring at a first time instance, wherein the first temporal base layer is configured to predict a frame of video content at a particular time within the encoded video bit stream for the first spatial layer when decoding the encoded video bit stream; and
   based on the identified transmission error, switching, by the data processing hardware at the first time instance, from decoding the first spatial layer of the encoded video bit stream to decoding a back-up spatial layer of the encoded video bit stream, the back-up spatial layer comprising a second temporal base layer at a second time instance unaffected by the transmission error for the respective data packet,
   wherein an encoder forming the encoded video bit stream shifted the second temporal base layer from the first time instance to the second time instance when the encoded video bit stream was encoded.

2. The method of claim 1, further comprising, while switching from decoding the first spatial layer of the encoded video bit stream to decoding the back-up spatial layer, reinitializing, by the data processing hardware, the first spatial layer of the encoded video bit stream.

3. The method of claim 2, wherein reinitializing the first spatial layer of the encoded video bit stream comprises retransmitting the respective data packet comprising the first temporal base layer for the first spatial layer of the encoded video bit stream.

4. The method of claim 1, wherein shifting the second temporal base layer from the first time instance to the second time instance when encoding the video bit stream into the encoded video bit stream distributes a bit rate allocated across time instances of the first spatial layer and the back-up spatial layer.

5. The method of claim 1, wherein the encoded video bit stream includes a temporal layer prediction pattern, the temporal layer prediction pattern comprising a plurality of temporal time slots during a temporal period, each temporal time slot associated with one of the first temporal base layer or one of a plurality of temporal layers for the corresponding spatial layer.

6. The method of claim 5, wherein a number of time slots for the plurality of time slots of the temporal period is equal to $2^{i-1}$ where i corresponds to a number of the temporal layers.

7. The method of claim 5, wherein a number of time slots for the plurality of temporal time slots of the temporal period is independent of a number of the temporal layers.

8. The method of claim 5, wherein a number of spatial layers scaled from the encoded video bit stream comprising the plurality of spatial layers is independent from a number of time slots for the plurality of temporal time slots during the temporal period.

9. The method of claim 5, wherein, at each spatial layer, the temporal period comprises a plurality of hierarchical temporal layers, the plurality of hierarchical temporal layers comprising at least one temporal layer predicted from a non-base temporal layer.

10. A system comprising:
    data processing hardware; and
    memory hardware in communication with the data processing hardware, the memory hardware storing instructions that when executed on the data processing hardware cause the data processing hardware to perform operations comprising:
receiving a plurality of data packets corresponding to an encoded video bit stream, the encoded video bit stream scalable into a plurality of spatial layers;
identifying a transmission error for a respective data packet of the plurality of data packets, the respective data packet comprising a first temporal base layer for a first spatial layer of the encoded video bit stream, the first temporal base layer occurring at a first time instance, wherein the first temporal base layer is configured to predict a frame of video content at a particular time within the encoded video bit stream for the first spatial layer when decoding the encoded video bit stream; and
based on the identified transmission error, switching, at the first time instance, from decoding the first spatial layer of the encoded video bit stream to decoding a back-up spatial layer of the encoded video bit stream, the back-up spatial layer comprising a second temporal base layer at a second time instance unaffected by the transmission error for the respective data packet,
wherein an encoder forming the encoded video bit stream shifted the second temporal base layer from the first time instance to the second time instance when the encoded video bit stream was encoded.

11. The system of claim 10, wherein the operations further comprise, while switching from decoding the first spatial layer of the encoded video bit stream to decoding the back-up spatial layer, reinitializing the first spatial layer of the encoded video bit stream.

12. The system of claim 11, wherein reinitializing the first spatial layer of the encoded video bit stream comprises retransmitting the respective data packet comprising the first temporal base layer for the first spatial layer of the encoded video bit stream.

13. The system of claim 10, wherein shifting the second temporal base layer from the first time instance to the second time instance when encoding the video bit stream into the encoded video bit stream distributes a bit rate allocated across time instances of the first spatial layer and the back-up spatial layer.

14. The system of claim 10, wherein the encoded video bit stream includes a temporal layer prediction pattern, the temporal layer prediction pattern comprising a plurality of temporal time slots during a temporal period, each temporal time slot associated with one of the first temporal base layer or one of a plurality of temporal layers for the corresponding spatial layer.

15. The system of claim 14, wherein a number of time slots for the plurality of time slots of the temporal period is equal to $2^{i-1}$ where i corresponds to a number of the temporal layers.

16. The system of claim 14, wherein a number of time slots for the plurality of temporal time slots of the temporal period is independent of a number of the temporal layers.

17. The system of claim 14, wherein a number of spatial layers scaled from the encoded video bit stream comprising the plurality of spatial layers is independent from a number of time slots for the plurality of temporal time slots during the temporal period.

18. The system of claim 14, wherein, at each spatial layer, the temporal period comprises a plurality of hierarchical temporal layers, the plurality of hierarchical temporal layers comprising at least one temporal layer predicted from a non-base temporal layer.

* * * * *